United States Patent [19]

Mizoguchi et al.

[11] Patent Number: 4,571,730
[45] Date of Patent: Feb. 18, 1986

[54] CROSS FLOW TYPE LASER DEVICES

[75] Inventors: Hakaru Mizoguchi; Akira Egawa, both of Hiratsuka; Akira Okamoto, Hadano, all of Japan

[73] Assignee: Kabushiki Kaisha Komatsu Seisakusho, Japan

[21] Appl. No.: 580,801

[22] Filed: Feb. 16, 1984

[30] Foreign Application Priority Data

Feb. 21, 1983 [JP] Japan ............................ 58-27418

[51] Int. Cl.⁴ .............................................. H01S 3/22
[52] U.S. Cl. ................................................ 372/58
[58] Field of Search ................ 372/58, 55, 59, 65, 372/61

[56] References Cited

U.S. PATENT DOCUMENTS 4,317,090  2/1982  Nagai et al. ......................... 372/58

Primary Examiner—William L. Sikes
Assistant Examiner—Léon Scott, Jr.
Attorney, Agent, or Firm—Diller, Ramik & Wight

[57] ABSTRACT

In a cross flow type laser device of the type comprising a cylindrical vacuum vessel, guide ducts for defining a laser medium circulating path, a fan for circulating the laser medium through the circulating path, discharge electrodes installed in the vacuum vessel for creating electrode discharge through circulating laser medium and a cooler for cooling the circulating laser medium, the fan is constructed as a cross-flow fan utilizing a portion of the inner wall of the vessel as a rear casing and a portion of the guide ducts as a front casing so that the fan has substantially the same axial length as that of the cylindrical vacuum vessel.

6 Claims, 4 Drawing Figures

CROSS FLOW TYPE LASER DEVICES

BACKGROUND OF THE INVENTION

This invention relates to a cross flow type laser device in which the direction of oscillation of the laser device and the direction of circulation of a laser medium or gas cross at right angles.

Generally, the cross flow type laser device is requested to have the following devices.

(1) A vacuum container of a high air tightness for preventing leakage of the laser medium and entrance of impurities.
(2) A drive device for circulating the laser medium in the vacuum vessel.
(3) A guide duct ensuring a smooth circulation of the laser medium.
(4) A cooling device for maintaining the temperature of the laser medium at a low value.

One example of the prior art cross flow type laser device provided with the four devices described above is shown in FIG. 1 which is constituted by a highly air tight vacuum vessel 1, a propeller fan 2, guide ducts 3, a radiator 4, etc. The laser medium is circulated by the fan 2 through a circulation path shown by arrows. In FIG. 1, although the circulation path is shown two dimensionally, at a discharge portion at which discharge electrodes 5 are provided, the circulation path is formed such that the laser medium flows from the rear side to the front side of the sheet of drawing.

In the discharge portion, continuously circulating laser medium is continuously excited by electric discharge between discharge electrodes 5 to form an inverted distribution region in the discharge portion. The energy stored in the inverted distribution region is taken out as a laser light beam L by a photoresonator constituted by a front mirror 6 and a rear mirror 7 disposed at right angles with respect to the flow of the laser medium.

The laser medium whose temperature has been raised while passing through the discharge portion is cooled by the radiator 4 and the laser medium is returned again to the inlet of the fan 2.

In the prior art cross flow type laser device, since fan 2, guide ducts 3 and radiator 4 are incorporated into the vacuum vessel 1 to form the circulating path, these are many points at which the laser medium expands and contracts and corners in the circulating path which increase the pressure loss of the laser medium. For this reason it is necessary to use a fan 2 having a large output and size and to use a large radiator 4. Accordingly, the overall efficiency of the laser device is lowered.

SUMMARY OF THE INVENTION

Accordingly, it is an object of this invention to provide an improved cross flow type laser device having a small size, a high efficiency and a simple construction.

Another object of this invention is to provide an improved cross flow type laser device wherein the pressure loss of the circulating laser medium can be reduced so that the power for driving the circulating fan can be reduced.

According to this invention, there is provided a cross flow type laser device of the type comprising a cylindrical vacuum vessel, guide ducts contained in the cylindrical vacuum vessel for defining a laser medium circulating path, a fan for circulating laser medium through the circulating path, discharge electrodes installed in the vacuum vessel for creating electric discharge through the circulating laser medium, and cooling means for cooling the circulating laser medium, characterized in that the fan comprises a cross-flow fan utilizing a portion of the inner wall of the vacuum vessel as a rear casing and a portion of the guide ducts as a front casing so that the fan has substantially the same axial length as that of the cylindrical vacuum vessel.

DESCRIPTION OF THE PREFERRED EMBODIMENTS

Figure 1:
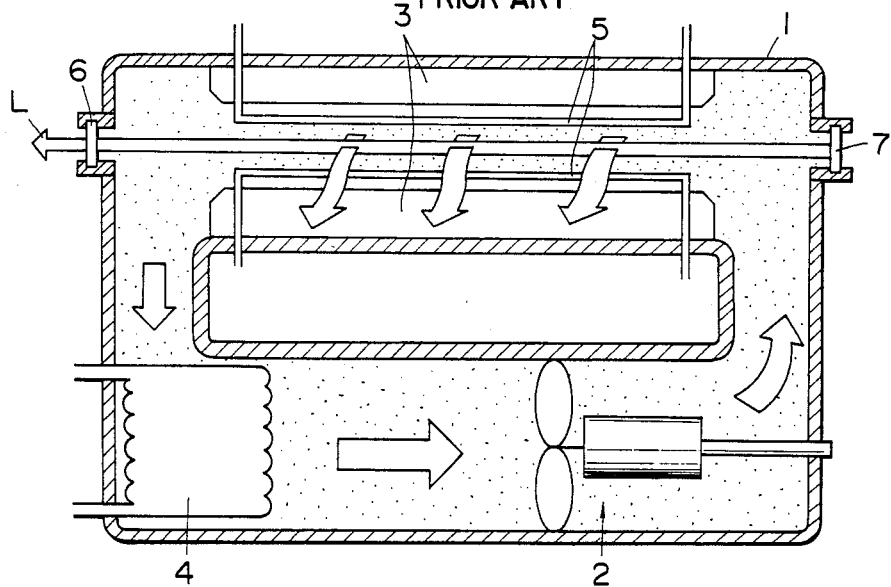
FIG. 1 is a longitudinal sectional view showing a prior art cross flow type laser device.
Figure 3:
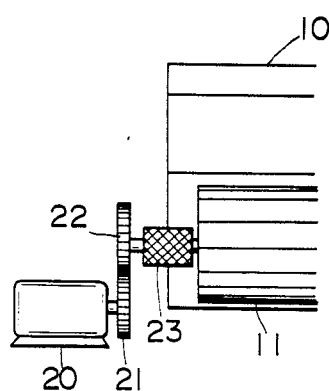
FIG. 3 is a partial view showing one example of fan drive means.
Figure 2:
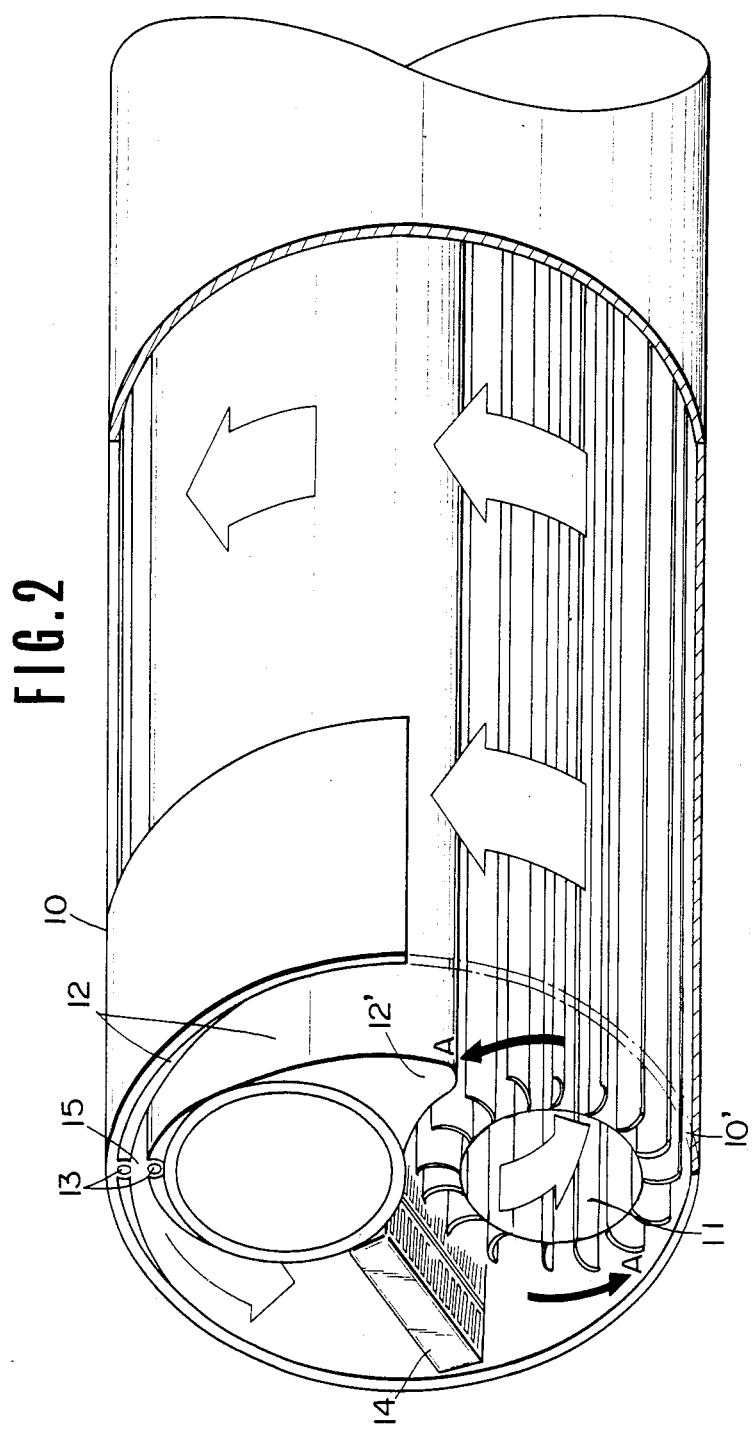
FIG. 2 is a perspective view, partly broken away, showing one embodiment of the cross flow type laser device embodying the present invention.

A preferred embodiment of the cross flow type laser beam device of this invention will now be described with reference to FIGS. 2 and 3. As shown, the laser device is constituted by a cylindrical vacuum vessel 10, a fan or impeller 11, guide ducts 12, discharge electrodes 13, and a radiator 14.

The cylindrical vacuum vessel 10 interrupts communication between a laser medium comprising a gaseous mixture of $CO_2$, $N_2$ and He and outside atmosphere, and its inner wall 10' acts as a back up casing for the fan 11. Further, the vessel acts as a guide duct for passing the laser medium.

The fan 11 is disposed along the inner wall 10' and its axial length is substantially the same as that of the cylindrical vacuum vessel 10. As shown in FIG. 3, the fan 11 is driven in the direction of arrows A (see FIG. 2) by an electric motor 20 mounted on the outside of the vessel 10. The fan 11 is driven by the motor 20 through gears 21 and 22 as shown in FIG. 3, and a magnetic fluid seal 23 is provided for maintaining air tightness of the vacuum vessel.

The guide ducts 12 define a circulating path for the laser medium together with the inner wall of the vessel 10; and form a front casing 12' acting as a front edge or a tongue. The rear portion of the inner wall 10' of the vessel, the front portion of the guide duct and the fan constitute a cross-flow fan. The pressure in the circulating path is selected to be about ¼ of the atmospheric pressure.

The discharge electrodes 13 are disposed in the longitudinal direction of the casing 10 on the opposite sides of the discharge portion in the circulating path and the radiator 14 is located at the inlet of the cross-flow fan.

The laser medium discharged by the cross-flow fan reaches the discharge portion 15, after passing through a diffuser formed by the guide ducts 12. At the discharge portion 15, the circulating laser medium is successively excited by the electric discharge between discharge electrodes 13 to form an inverted distribution region in the discharge portion and the energy stored in this region is diverted out as a laser light beam by the operation of a photoresonator, not shown, located at right angles with respect to the flow. The laser medium whose temperature has been raised while passing through the discharge portion 15 is cooled by the radiator 14 and the returns to the inlet of the cross-flow fan.

With the cross flow type laser device described above, since the pressure loss of the circulating laser medium is extremely small, not only the fan driving power can be made small but also the volume of the laser device as a whole can be reduced.

Figure 4:
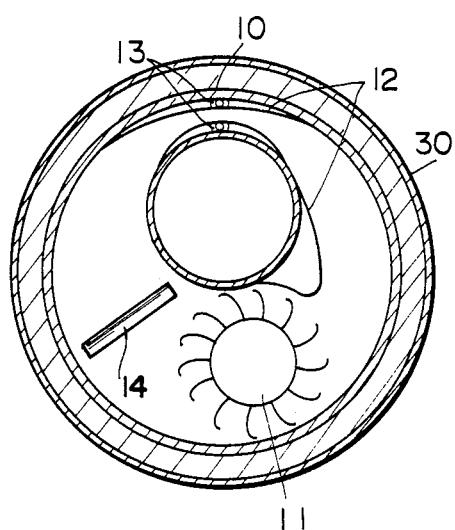
FIG. 4 is a cross sectional view showing another embodiment of this invention.

Although in the foregoing embodiment, radiator 14 was installed in the circulating path, in a modification shown in FIG. 4, a cylinder 30 is provided to surround the vessel 10 and cooling water is circulated through a space therebetween so as to cool the laser medium in the vessel 10. This construction can eliminate a radiator. Furthermore, the first embodiment relates to a three orthogonal axes type cross flow type laser device in which the direction of electric discharge between the discharge electrodes 13, the direction of flow of the laser medium at the discharge portion 15 and the direction of the laser beam intersect at right angles with each other, but it should be understood that the invention is also applicable a two orthogonal axes type cross flow type laser device in which the discharge electrodes 13 are provided up and down in discharge region of the flow path of the laser medium so as to make the same the direction of electric discharge and the direction of flow of the laser medium.

As above described, according to this invention since the volume of the laser device as a whole is small and since the pressure loss of the laser medium in the circulating path is very small the fan driving power can be reduced with the result that the overall efficiency can be improved and the construction can be simplified. As the laser device is cylindrical, the flow can be treated as a two dimensional flow instead of a three dimensional flow when trying an optimum design of the circulating flow path, thus facilitating the design when it is necessary to increase the length of the resonator for grade nob due to the cylindrical construction, it is only necessary to increase the axial length so that a number of component parts can be used commonly for preparing laser devices having different capacities, thus decreasing the manufacturing cost.

What is claimed is:

1. A cross flow type laser device comprising a generally cylindrical vacuum vessel defined by a generally cylindrical wall, an impeller in said vacuum vessel, said cylindrical wall and impeller having generally parallel axes, said impeller including a peripheral edge disposed adjacent an inner wall portion of said cylindrical wall and defining therewith a gas laser medium inlet to and a gas laser medium outlet from said impeller, said impeller and vacuum vessel having substantially coextensive axial lengths, means for rotating said impeller to establish a generally closed circumferential flow path for the gas laser medium within said vacuum vessel along said cylindrical wall in a direction from said gas laser medium inlet to said gas medium outlet, axially disposed discharge electrodes withn said vessel spaced downstream of said gas laser medium outlet for exciting the gas laser medium, optical resonator means at axially opposite ends of said vessel for generating a laser light beam from the excited gas laser medium, means for cooling the gas laser medium and an axially extending guide duct means having a front portion disposed adjacent said gas laser medium outlet, said front portion of said guide duct means and said impeller constitute a cross flow impeller, after passing through a diffuser formed by said guide duct means said laser medium discharged by said cross flow impeller reaches a discharge portion and is excited distribution region where energy stored in said region is diverted out as an output beam by a photoresonator.

2. The cross flow type laser device as defined in claim 1 wherein said cooling means comprises a radiator within said vacuum vessel which is in the circumferential flow path of the gas laser medium.

3. The cross flow type laser device as defined in claim 1 wherein said discharge electrodes are disposed at least one on each side of the circumferential flow path of the gas laser medium whereby discharge therebetween is perpendicular to the circumferential flow path.

4. The cross flow type laser device as defined in claim 1 wherein said discharge electrodes are disposed such that the direction of electric discharge is the same as the direction of the circumferential flow path of the gas laser medium.

5. The cross flow type laser device as defined in claim 2 wherein said discharge electrodes are disposed at least one on each side of the circumferential flow path of the gas laser medium whereby discharge therebetween is perpendicular to the circumferential flow path.

6. The cross flow type laser device as defined in claim 2 wherein said discharge electrodes are disposed such that the direction of electric discharge is the same as the direction of the circumferential flow path of the gas laser medium.

* * * * *